United States Patent [19]

Yamamoto

[11] Patent Number: 5,298,551
[45] Date of Patent: Mar. 29, 1994

[54] VINYL CHLORIDE RESIN COMPOSITIONS

[75] Inventor: Youzo Yamamoto, Kuga, Japan

[73] Assignee: Mitsui Petrochemical Industries, Ltd., Tokyo, Japan

[21] Appl. No.: 849,075

[22] PCT Filed: Nov. 11, 1991

[86] PCT No.: PCT/JP91/01540

§ 371 Date: Apr. 28, 1992

§ 102(e) Date: Apr. 28, 1992

[87] PCT Pub. No.: WO91/08078

PCT Pub. Date: Jun. 13, 1991

[51] Int. Cl.$^5$ .................. C08L 45/00; C08L 27/06
[52] U.S. Cl. .................... 524/518; 525/210;
525/211; 525/75; 524/423; 524/399; 524/317;
524/312; 524/311; 524/306
[58] Field of Search ........... 525/210, 211; 524/518

[56] References Cited

U.S. PATENT DOCUMENTS

| | | | |
|---|---|---|---|
| 4,140,731 | 2/1979 | Nakamura et al. | 525/210 |
| 4,433,105 | 2/1984 | Matsuda et al. | 525/211 |
| 4,614,778 | 9/1986 | Kajiura et al. | 526/169.2 |
| 4,874,808 | 10/1989 | Minami et al. | 525/210 |
| 4,931,520 | 6/1990 | Yamanashi et al. | 526/281 |
| 4,992,511 | 2/1991 | Yamamoto et al. | 525/210 |
| 5,180,767 | 1/1993 | Sakai et al. | 525/210 |

FOREIGN PATENT DOCUMENTS

| | | |
|---|---|---|
| 0156464 | 2/1985 | European Pat. Off. |
| 223722 | 6/1985 | Fed. Rep. of Germany |
| 61-102500 | 5/1986 | Japan |
| 61-185553 | 8/1986 | Japan |
| 60-168708 | 4/1992 | Japan |
| 1454336 | 11/1976 | United Kingdom |

*Primary Examiner*—Carman J. Seccuro, Jr.
*Attorney, Agent, or Firm*—Sherman and Shalloway

[57] ABSTRACT

The present invention provides a vinyl chloride resin composition having an elevated heat distortion temperature, comprising ]I[ [A] a vinyl chloride resin, and

[II] [B] cycloolefin ring opening polymer or copolymer formed by ring opening polymerization of a cycloolefin represented by the formula [I], or a hydrogenated product thereof, and/or

[C] a cycloolefin random copolymer of ethylene and a cycloolefin represented by the formula [I], said copolymer having an intrinsic viscosity [η], as measured in decalin at 135° C., of 0.05 to 10 dl/g and a glass transition temperature Tg of at least 70° C.,

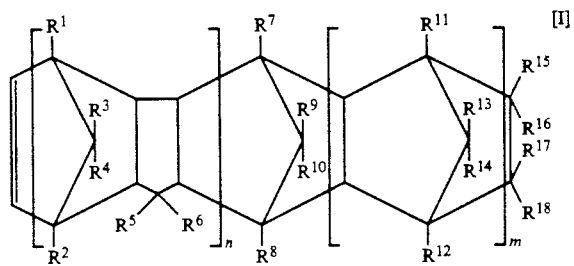

wherein n is 0 or 1, and m is 0 or a positive integer.

3 Claims, No Drawings

VINYL CHLORIDE RESIN COMPOSITIONS

FIELD OF THE INVENTION

The present invention relates to vinyl chloride resin compositions, and particularly to vinyl chloride resin compositions having an elevated heat distortion (deflection) temperature by incorporation of a cycloolefin polymer thereinto to improve the properties of the molded articles.

BACKGROUND OF THE INVENTION

Vinyl chloride resins such as polyvinyl chloride, copolymers of vinyl chloride and other monomers, or vinyl chloride resin derivatives, for example, halogenated polyvinyl chloride (these resins being merely referred to vinyl chloride resins hereinafter) have excellent scratch resistance, flame retarding properties, chemical resistance and electric characteristics, and show a decreased mold shrinkage factor. Vinyl chloride resins are therefore used as material for various molded articles. Molded articles made of vinyl chloride resins are used under such peculiar circumstances as water tanks of electric irons, electronic oven parts, printed circuit boards, conductive sheets and helmets.

However, conventional vinyl chloride resins have a problem that molded products obtained therefrom are restricted in their use due to their low heat distortion temperature, although they are excellent in flame retarding properties, chemical resistance, a low mold shrinkage factor, etc.

An object of the present invention is to provide vinyl chloride resin compositions having an elevated heat distortion (deflection) temperature or an elevated heat deformation temperature while excellent properties of conventional vinyl chloride resin compositions, such as flame retarding properties and a low mold shrinkage factor, are maintained.

DISCLOSURE OF THE INVENTION

A vinyl chloride resin composition according to the present invention comprises

[I] [A] a vinyl chloride resin and

[II] [B] a cycloolefin ring opening polymer or copolymer formed by ring opening polymerization of a cycloolefin represented by the following formula [I], or a hydrogenated product thereof, and/or

[C] a cycloolefin random copolymer of ethylene and a cycloolefin represented by the following formula [I], said random copolymer having an intrinsic viscosity [η], as measured at 135° C. in decalin, of 0.05 to 10 dl/g and a glass transition temperature (Tg) of at least 70° C.,

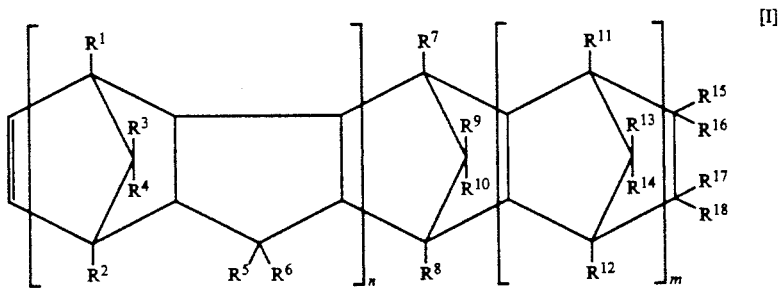

wherein n is 0 or 1, m is 0 or a positive integer, $R^1$–$R^{18}$ are each independently an atom or a group selected from the group consisting of hydrogen, halogen and hydrocarbon groups, $R^{15}$–$R^{18}$, linked together, may form a monocyclic ring or polycyclic ring which may have a double bond, $R^{15}$ and $R^{16}$ or $R^{17}$ and $R^{18}$ may form together an alkylidene group.

The vinyl chloride resin compositions according to the present invention comprise a vinyl chloride resin [A], and a specific cycloolefin ring opening polymer or copolymer, or a hydrogenated product thereof [B], and/or a specific cycloolefin random copolymer [C]. Accordingly, it becomes possible to elevate the heat distortion temperature thereof, and improve the plastication and decomposition temperature thereof while the excellent flame retarding properties and small mold shrinkage factors are maintained.

The excellent properties of the vinyl chloride resin [A] are not impaired even when the vinyl chloride resin contains the cycloolefin ring opening polymer or copolymer, or hydrogenated product thereof [B] and/or the cycloolefin random copolymer [C].

DETAILED DESCRIPTION OF THE INVENTION

The vinyl chloride resin compositions according to the present invention are concretely illustrated below.

The present invention is based on the finding that the heat distortion temperature of the vinyl chloride resin [A] is significantly increased when the resin [A] contains the cycloolefin ring opening polymer or copolymer, or hydrogenated product thereof [B] and/or the cycloolefin random copolymer [C] ([B] and [C] may be generally referred to cycloolefin copolymers hereinafter).

The vinyl chloride resin composition according to the present invention comprises

[I] a vinyl chloride resin [A], and

[II] a cycloolefin ring opening polymer or copolymer formed by ring opening polymerization of a cycloolefin represented by the following formula [I], or a hydrogenated product thereof [B], and/or a cycloolefin random copolymer of ethylene and a cycloolefin represented by the following formula [I] [C],

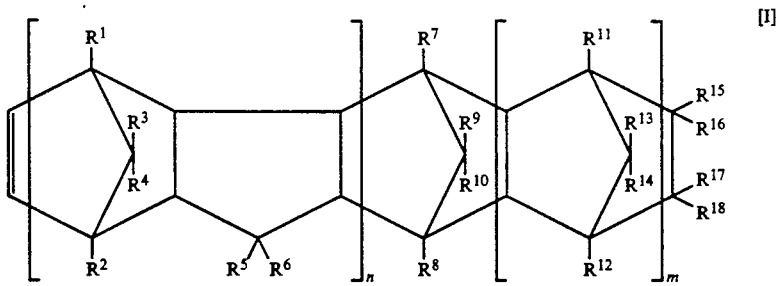

wherein n is 0 or 1, m is 0 or a positive integer, $R^1$–$R^{18}$ are each independently an atom or a group selected from the group consisting of hydrogen, halogen and hydrocarbon groups, $R^{15}$–$R^{18}$, linked together, may form a monocyclic ring or a polycyclic ring which may have a double bond, $R^{15}$ and $R^{16}$, or $R^{17}$ and $R^{18}$ may form together an alkylidene group.

The vinyl chloride resin compositions containing a cycloolefin polymer have an elevated heat distortion temperature (HDT measured by the heat deflection method according to ASTM D 648) while maintaining flame retarding properties, etc. compared with singly used conventional vinyl chloride resins. The comparison of Examples 1 to 3 and Comparative Example 1, which are described later, shows that the vinyl chloride resin in Comparative Example 1 containing no cycloolefin copolymer exhibits a lower heat distortion temperature than that of the vinyl chloride resin compositions in Examples 1 to 3 containing a cycloolefin copolymer. Further, the resin compositions in Examples 1 to 3 have the same excellent tensile strength at break and flame retarding properties as the resin in Comparative Example 1, which shows the physical properties of the vinyl chloride resin are maintained in the vinyl chloride resin compositions according to the present invention.

In addition, the vinyl chloride resins herein are not restricted to polyvinyl chloride, but include copolymers of vinyl chloride and other polymerizable monomers such as vinyl acetate and vinylidene chloride, vinyl chloride-grafted products such as a vinyl chloride-grafted ethylene/vinyl acetate copolymer, and derivatives of chlorinated vinyl chloride resins obtained by chlorinating polyvinyl chloride.

VINYL CHLORIDE RESINS

Typical example of the vinyl chloride resin [A] used in the vinyl chloride resin compositions according to the present invention is polyvinyl chloride, but is not restricted to the polyvinyl chloride. The vinyl chloride resin [A] may be a copolymer of vinyl chloride and other polymerizable monomers, or a modified product derived from vinyl chloride.

(1) Examples of the copolymer of vinyl chloride include vinyl chloride/vinyl acetate copolymer, vinyl chloride/vinylidene chloride copolymer, vinyl chloride/(meth)acrylic acid copolymer, vinyl chloride/(meth)acrylate copolymer, vinyl chloride/maleic acid copolymer, vinyl chloride/maleate copolymer, vinyl chloride/acrylonitrile copolymer and vinyl chloride/α-olefin random copolymer (α-olefin including ethylene and propylene).

(2) Examples of the vinyl chloride-grafted product include vinyl chloride-grafted products of ethylene/vinyl acetate copolymer and butadiene/acrylate copolymer.

Furthermore, the vinyl chloride resin [A] includes modified (co)polymers prepared by grafting the (co)polymers described in (1) and (2) with a vinyl monomer such as styene and methacrylate.

In addition, the modified product derived from polyvinyl chloride includes chlorinated vinyl chloride resin obtained by chlorinating polyvinyl chloride.

The vinyl chloride resin [A] has a melt flow rate, as measured at 190° C. under a load of 2.16 kg, of 0.1 to 500 g/10 min, preferably 1 to 100 g/10 min and especially 5 to 50 g/10 min.

The vinyl chloride resin [A] has an average polymerization degree of 200 to 5000, preferably 300 to 4000 and especially 400 to 3000.

The vinyl chloride resin [A] has, under a load of 18.6 kg, a heat distortion temperature of 40° to 90° C., preferably 50° to 80° C.

The vinyl chloride resin [A] has a glass transition temperature (Tg) of 40° to 90° C., preferably 50° to 80° C.

CYCLOOLEFIN POLYMER CONTAINED IN VINYL CHLORIDE RESIN

The cycloolefin polymers used in the vinyl chloride resin compositions of the invention include

[B] a ring opening polymer or copolymer of a cycloolefin represented by the aforementioned formula [I], or a hydrogenated product thereof, and

[C] a cycloolefin random copolymer obtained by addition polymerization of ethylene and a cycloolefin represented by the aforementioned formula [I].

In the above-mentioned formula [I], n is 0 or 1, and m is 0 or a positive integer, preferably 0 to 3.

$R^1$–$R^{18}$ each independently represent an atom or a group selected from the group consisting of hydrogen, halogen and hydrocarbon groups. The halogen herein includes a fluorine atom, a chlorine atom, a bromine atom and an iodine atom. The hydrocarbon groups each include usually an alkyl group of 1 to 10 carbon atoms and a cycloalkyl group of 5 to 15 carbon atoms. Concrete examples of the alkyl group include methyl, ethyl, isopropyl, isobutyl, n-amyl, neopentyl, n-hexyl, n-octyl, n-decyl and 2-ethylhexyl. Concrete examples of the cycloalkyl group include cyclohexyl, methylcyclohexyl and ethylcyclohexyl.

Furthermore, in the above-mentioned formula [I], $R^{15}$–$R^{18}$, linked with one another (together), may form a monocyclic ring or a polycyclic ring which may have a double bond.

In addition, $R^{15}$ and $R^{16}$, or $R^{17}$ and $R^{18}$ may form an alkylidene group. The alkylidene group is usually one having 2 to 10 carbon atoms. Concrete examples of the alkylidene group include ethylidene, propylidene, isopropylidene, butylidene and isobutylidene.

In the aforementioned formula [I], $R^{15}$–$R^{18}$, linked together, may form a monocyclic ring or a polycyclic ring which may have a double bond.

The cycloolefin represented by the formula [I] can be easily prepared by condensation reaction through Diels-Alder reaction of cyclopentadienes with corresponding olefins or cycloolefins.

Concrete examples of the cycloolefin represented by the above-mentioned formula [I] include the following compounds.

Bicyclo [2,2,1]hept-2-ene derivatives such as those mentioned below.

Bicyclo[2,2,1]hept-2-ene

6-Methylbicyclo[2,2,1]hept-2-ene

5,6-Dimethylbicyclo[2,2,1]hept-2-ene

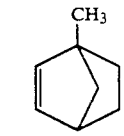

1-Metylbicyclo[2,2,1]hept-2-ene

6-Ethylbicyclo[2,2,1]hept-2-ene

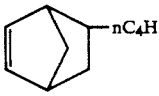

6-n-Butylbicyclo[2,2,1]hept-2-ene

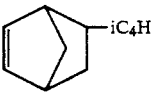

6-Isobutylbicyclo[2,2,1]hept-2-ene

7-Methylbicyclo[2,2,1]hept-2-ene

Tetracyclo[4,4,0,1$^{2.5}$,1$^{7.10}$]-3-dodecene derivatives such as those described below.

Tetracyclo[4,4,0,1$^{2.5}$,1$^{7.10}$]-3-dodecene

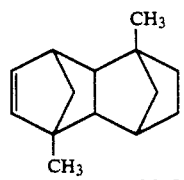

5,10-Dimethyltetracyclo[4,4,0,1$^{2.5}$,1$^{7.10}$]-3-dodecene

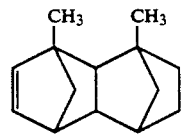

2,10-Dimethyltetracyclo[4,4,0,1$^{2.5}$,1$^{7.10}$]-3-dodecene

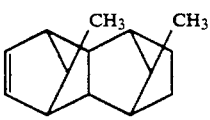

11,12-Dimethyltetracyclo[4,4,0,1$^{2.5}$,1$^{7.10}$]-3-dodecene

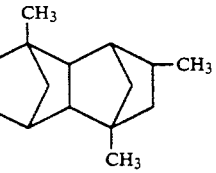

2,7,9-Trimethyltetracyclo[4,4,0,1$^{2.5}$,1$^{7.10}$]-3-dodecene

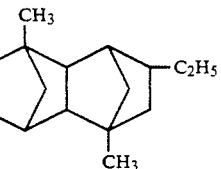

9-Ethyl-2,7-dimethyltetracyclo[4,4,0,1$^{2.5}$,1$^{7.10}$]-3-dodecene

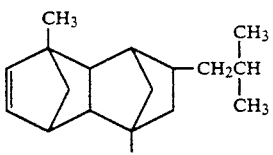

9-Isobutyl-2,7-dimethyltetracyclo[4,4,0,1$^{2.5}$,1$^{7.10}$]-3-dodecene

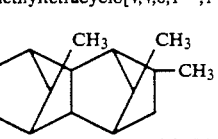

9,11,12-Trimethyltetracyclo[4,4,0,1$^{2.5}$,1$^{7.10}$]-3-dodecene

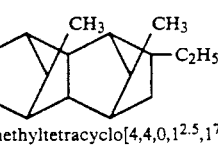

9-Ethyl-11,12-dimethyltetracyclo[4,4,0,1$^{2.5}$,1$^{7.10}$]-3-dodecene

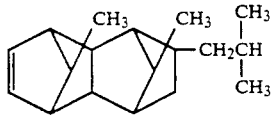

-continued

9-Isobutyl-11,12-dimethyltetracyclo[4,4,0,1$^{2.5}$,1$^{7.10}$]-3-dodecene

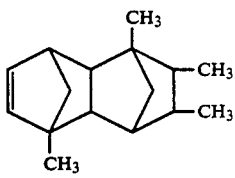

5,8,9,10-Tetramethyltetracyclo[4,4,0,1$^{2.5}$,1$^{7.10}$]-3-dodecene

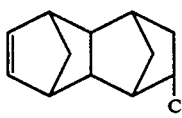

8-Methyltetracyclo[4,4,0,1$^{2.5}$,1$^{7.10}$]-3-dodecene

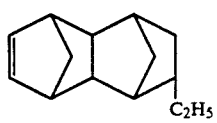

8-Ethyltetracyclo[4,4,0,1$^{2.5}$,1$^{7.10}$]-3-dodecene

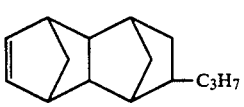

8-Propyltetracyclo[4,4,0,1$^{2.5}$,1$^{7.10}$]-3-dodecene

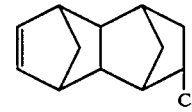

8-Hexyltetracyclo[4,4,0,1$^{2.5}$,1$^{7.10}$]-3-dodecene

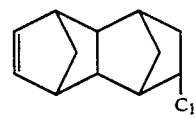

8-Stearyltetracyclo[4,4,0,1$^{2.5}$,1$^{7.10}$]-3-dodecene

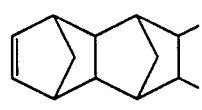

8,9-Dimethyltetracyclo[4,4,0,1$^{2.5}$,1$^{7.10}$]-3-dodecene

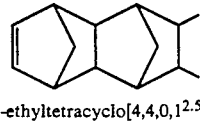

8-Methyl-9-ethyltetracyclo[4,4,0,1$^{2.5}$,1$^{7.10}$]-3-dodecene

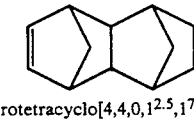

8-Chlorotetracyclo[4,4,0,1$^{2.5}$,1$^{7.10}$]-3-dodecene

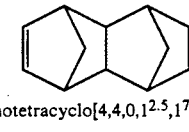

8-Bromotetracyclo[4,4,0,1$^{2.5}$,1$^{7.10}$]-3-dodecene

-continued

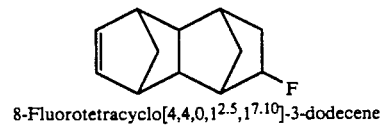

8-Fluorotetracyclo[4,4,0,1$^{2.5}$,1$^{7.10}$]-3-dodecene

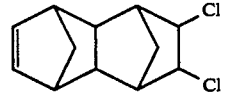

8,9-Dichlorotetracyclo[4,4,0,1$^{2.5}$,1$^{7.10}$]-3-dodecene

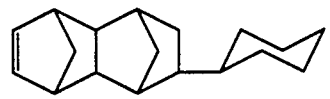

8-Cyclohexyltetracyclo[4,4,0,1$^{2.5}$,1$^{7.10}$]-3-dodecene

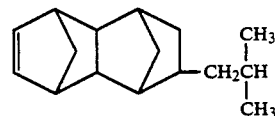

8-Isobutyltetracyclo[4,4,0,1$^{2.5}$,1$^{7.10}$]-3-dodecene

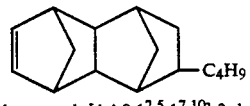

8-Butyltetracyclo[4,4,0,1$^{2.5}$,1$^{7.10}$]-3-dodecene

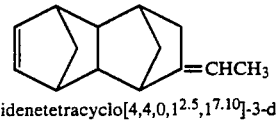

8-Ethylidenetetracyclo[4,4,0,1$^{2.5}$,1$^{7.10}$]-3-dodecene

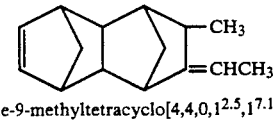

8-Ethylidene-9-methyltetracyclo[4,4,0,1$^{2.5}$,1$^{7.10}$]-3-dodecene

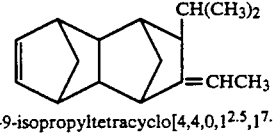

8-Ethylidene-9-ethyltetracyclo[4,4,0,1$^{2.5}$,1$^{7.10}$]-3-dodecene

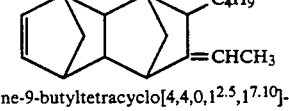

8-Ethylidene-9-isopropyltetracyclo[4,4,0,1$^{2.5}$,1$^{7.10}$]-3-dodecene

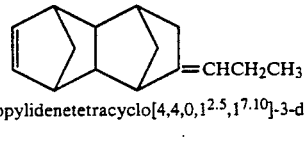

8-Ethylidene-9-butyltetracyclo[4,4,0,1$^{2.5}$,1$^{7.10}$]-3-dodecene 8-n-Propylidenetetracyclo[4,4,0,1$^{2.5}$,1$^{7.10}$]-3-dodecene -continued

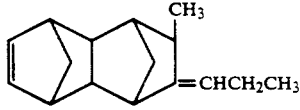
8-n-Propylidene-9-methyltetracyclo[4,4,0,1$^{2.5}$,1$^{7.10}$]-3-dodecene

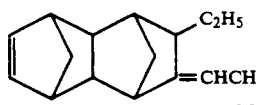
8-n-Propylidene-9-ethyltetracyclo[4,4,0,1$^{2.5}$,1$^{7.10}$]-3-dodecene

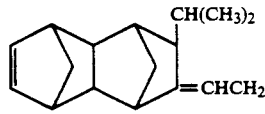
8-n-Propylidene-9-isopropyltetracyclo[4,4,0,1$^{2.5}$,1$^{7.10}$]-3-dodecene

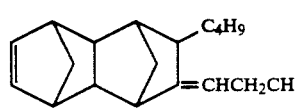
8-n-Propylidene-9-butyltetracyclo[4,4,0,1$^{2.5}$,1$^{7.10}$]-3-dodecene

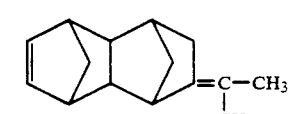
8-Isopropylidenetetracyclo[4,4,0,1$^{2.5}$,1$^{7.10}$]-3-dodecene

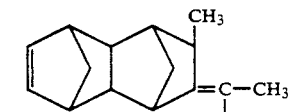
8-Isopropylidene-9-methyltetracyclo[4,4,0,1$^{2.5}$,1$^{7.10}$]-3-dodecene

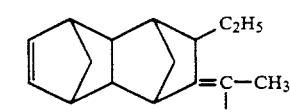
8-Isopropylidene-9-ethyltetracyclo[4,4,0,1$^{2.5}$,1$^{7.10}$]-3-dodecene

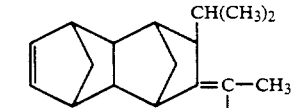
8-Isopropylidene-9-isopropyltetracyclo[4,4,0,1$^{2.5}$,1$^{7.10}$]-3-dodecene

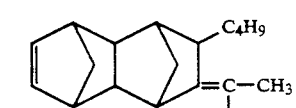
8-Isopropylidene-9-butyltetracyclo[4,4,0,1$^{2.5}$,1$^{7.10}$]-3-dodecene Hexacyclo[6,6,1,1$^{3.6}$, 1$^{10.13}$,0$^{2.7}$,0$^{9.14}$]-4-heptadecene derivatives such as those mentioned below.

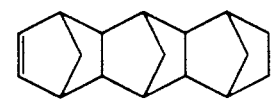
Hexacyclo[6,6,1,1$^{3.6}$,1$^{10.13}$,0$^{2.7}$,0$^{9.14}$]-4-heptadecene

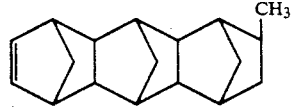
12-Methylhexacyclo[6,6,1,1$^{3.6}$,1$^{10.13}$,0$^{2.7}$,0$^{9.14}$]-4-heptadecene

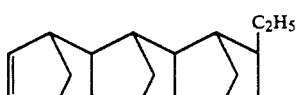
12-Ethylhexacyclo[6,6,1,1$^{3.6}$,1$^{10.13}$,0$^{2.7}$,0$^{9.14}$]-4-heptadecene

12-Isobutylhexacyclo[6,6,1,1$^{3.6}$,1$^{10.13}$,0$^{2.7}$,0$^{9.14}$]-4-heptadecene

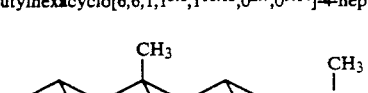
1,6,10-Trimethyl-12-isobutylhexacyclo-[6,6,1,1$^{3.6}$,1$^{10.13}$,0$^{2.7}$,0$^{9.14}$]-4-heptadecene Octacyclo[8,8,0,1$^{2.9}$,1$^{4.7}$,1$^{11.18}$,1$^{13.16}$,0$^{3.8}$,0$^{12.17}$]-5-docosene derivatives such as those mentioned below.

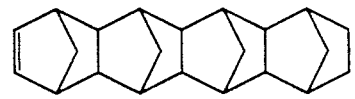
Octacyclo[8,8,0,1$^{2.9}$,1$^{4.7}$,1$^{11.18}$,1$^{13.16}$,0$^{3.8}$,0$^{12.17}$]-5-docosene

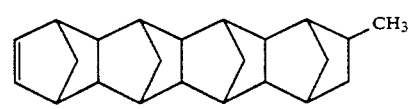
15-Methyloctacyclo[8,8,0,1$^{2.9}$,1$^{4.7}$,1$^{11.18}$,1$^{13.16}$,0$^{3.8}$,0$^{12.17}$]-5-docosene

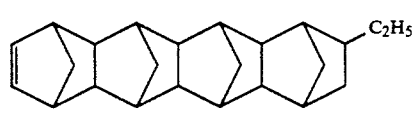
15-Ethyloctacyclo[8,8,0,1$^{2.9}$,1$^{4.7}$,1$^{11.18}$,1$^{13.16}$,0$^{3.8}$,0$^{12.17}$]-5-docosene Pentacyclo[6,6,1,1$^{3.6}$,0$^{2.7}$,0$^{9.14}$]-4-hexadecene derivatives such as those mentioned below.

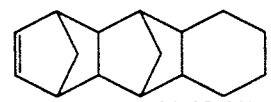
Pentacyclo[6,6,1,1$^{3.6}$,0$^{2.7}$,0$^{9.14}$]-4-hexadecene

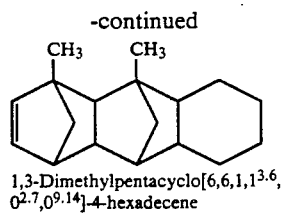

1,3-Dimethylpentacyclo[6,6,1,1$^{3.6}$,
0$^{2.7}$,0$^{9.14}$]-4-hexadecene

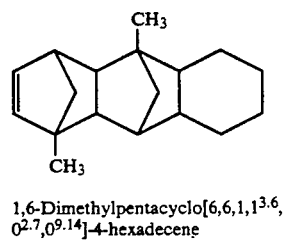

1,6-Dimethylpentacyclo[6,6,1,1$^{3.6}$,
0$^{2.7}$,0$^{9.14}$]-4-hexadecene

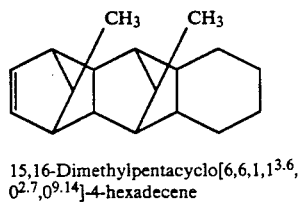

15,16-Dimethylpentacyclo[6,6,1,1$^{3.6}$,
0$^{2.7}$,0$^{9.14}$]-4-hexadecene

Heptacyclo-5-eicosene derivatives or heptacyclo-5-heneicosene derivatives such as those mentioned below.

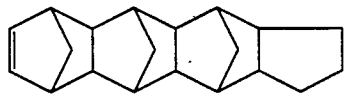

Heptacyclo[8,7,0,1$^{2.9}$,1$^{4.7}$,1$^{11.17}$,
0$^{3.8}$,0$^{12.16}$]-5-eicosene

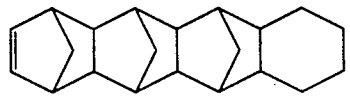

Heptacyclo[8,7,0,1$^{2.9}$,1$^{4.7}$,1$^{11.18}$,
0$^{3.8}$,0$^{12.17}$]-5-heneicosene Tricyclo[4,3,0,1$^{2.5}$]-3-decene derivatives such as those mentioned below.

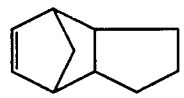

Tricyclo[4,3,0,1$^{2.5}$]-3-decene

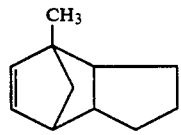

2-Methyltricyclo[4,3,0,1$^{2.5}$]-3-decene

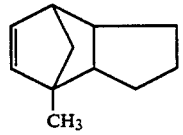

5-Methyltricyclo[4,3,0,1$^{2.5}$]-3-decene

Tricyclo[4,4,0,1$^{2.5}$]-3-undecene derivatives such as those mentioned below.

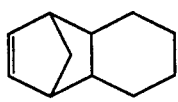

Tricyclo[4,4,0,1$^{2.5}$]-3-undecene

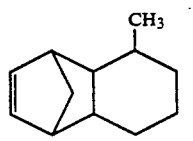

10-Methyltricyclo[4,4,0,1$^{2.5}$]-3-undecene

Pentacyclo[6,5,1,1$^{3.6}$,0$^{2.7}$,0$^{9.13}$]-4-pentadecene derivatives such as those mentioned below.

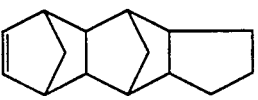

Pentacyclo[6,5,1,1$^{3.6}$,0$^{2.7}$,0$^{9.13}$]-4-pentadecene

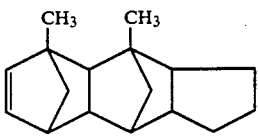

1,3-Dimethylpentacyclo[6,5,1,1$^{3.6}$,
0$^{2.7}$,0$^{9.13}$]-4-pentadecene

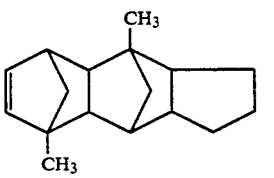

1,6-Dimethylpentacyclo[6,5,1,1$^{3.6}$,
0$^{2.7}$,0$^{9.13}$]-4-pentadecene

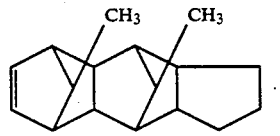

14,15-Dimethylpentacyclo[6,5,1,
1$^{3.6}$,0$^{2.7}$,0$^{9.13}$]-4-pentadecene

-continued

Diene compounds such as mentioned below.

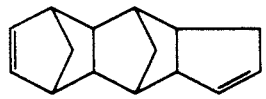

Pentacyclo[6,5,1,1$^{3.6}$,0$^{2.7}$,0$^{9.13}$]-4,10-pentadecadiene

Pentacyclo[4,7,0,1$^{2.5}$,0$^{8.13}$,1$^{9.12}$]-3-pentadecene derivatives such as those mentioned below.

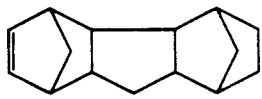

Pentacyclo[4,7,0,1$^{2.5}$,0$^{8.13}$,1$^{9.12}$]-3-pentadecene

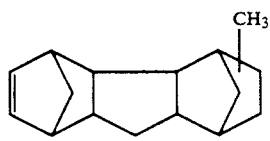

Methyl-substituted pentacyclo[4,7,0,1$^{2.5}$,0$^{8.13}$,1$^{9.12}$]-3-pentadecene Heptacyclo[7,8,0,1$^{3.6}$,0$^{2.7}$,1$^{10.17}$,0$^{11.16}$,1$^{12.15}$]-4-eicosene derivatives such as those mentioned below.

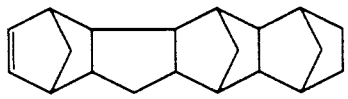

Heptacyclo[7,8,0,1$^{3.6}$,0$^{2.7}$,1$^{10.17}$,0$^{11.16}$,1$^{12.15}$]-4-eicosene

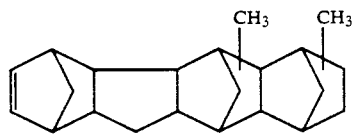

Dimethyl-substituted heptacyclo-[7,8,0,1$^{3.6}$,0$^{2.7}$,1$^{10.17}$,0$^{11.16}$,1$^{12.15}$]-4-eicosene Nonacyclo[9,10,1,1$^{4.7}$,0$^{3.8}$,0$^{2.10}$,0$^{12.21}$,1$^{13.20}$,0$^{14.19}$,1$^{15.18}$]-5-pentacosene derivatives such as those mentioned below.

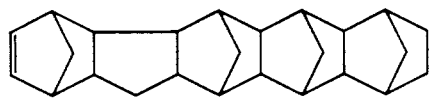

Nonacyclo[9,10,1,1$^{4.7}$,0$^{3.8}$,0$^{2.10}$,0$^{12.21}$,1$^{13.20}$,0$^{14.19}$,1$^{15.18}$]-5-pentacosene

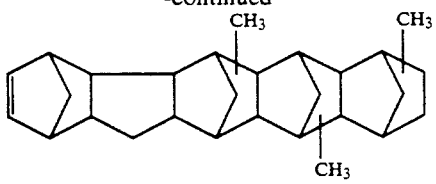

Trimethyl-substituted nonacyclo-[9,10,1,1$^{4.7}$,0$^{3.8}$,0$^{2.10}$,0$^{12.21}$,1$^{13.20}$,0$^{14.19}$,1$^{15.18}$]-5-pentacosene Subsequently,

[B] the cycloolefin ring opening polymer or copolymer, or hydrogenated product thereof and

[C] the cycloolefin random copolymer [C] used in the resin compositions according to the present invention are illustrated below in detail.

[B] CYCLOOLEFIN RING OPENING POLYMER OR COPOLYMER, OR HYDROGENATED PRODUCT THEREOF

The cycloolefin ring opening polymer and ring opening copolymer used in the invention can be obtained by ring opening polymerization of a cycloolefin represented by the formula [I] mentioned above in the presence of a catalyst comprising, for example, a halide, a nitride or an acetylacetone compound of a metal such as ruthenium, rhodium, palladium, osmium, indium or platinum, and a reducing agent such as an alcohol. The resultant product may be a homopolymer or a copolymer. For example, the resultant homopolymer may be a polymerization product of 1,4,5,8-dimethano-1,2,3,4,4a,5,8,8a-octahydronaphthalenes, or a copolymerization product of said naphthalenes and norbornenes such as bicyclo[2.2.1]hept-2-ene.

The double bonds remaining in the cycloolefin ring opening polymer and ring opening copolymer as described above can be easily hydrogenated in the presence of a hydrogenation catalyst. The resultant hydrogenated product provides molding material which is more excellent in heat stability and weathering resistance.

Any of heterogeneous catalysts or homogeneous catalysts generally used for hydrogenation of olefins may be used as the hydrogenation catalysts.

Useful heterogeneous catalysts include catalysts in which a metal such as nickel, palladium or platinum, or a catalyst prepared by supporting these metals on a carrier such as carbon, silica, diatomaceous earth, alumina or titanium oxide. Concrete examples of the heterogeneous catalyst include nickel/silica, nickel/diatomaceous earth, palladium/carbon, palladium/silica, palladium/diatomaceous earth and palladium/alumina.

Useful homogeneous catalysts include catalysts containing a Group VIII metal in the periodic table. Concrete examples of the catalysts include catalysts comprising nickel or cobalt compounds, and organometal compounds containing metals belonging to Group I to III in the periodic table such as nickel and cobalt, for example, nickel naphthenate/triethylamine, naphthenic acid n-butyllithium naphthenate and acetylacetonatonickel/triethylaluminum, and rhodium compounds.

The hydrogenation reaction can be carried out in a homogeneous or a heterogeneous system, depending on the type of the catalysts.

The hydrogen gas pressure in the hydrogenation is usually 1 to 150 atmospheric pressure, and the reaction temperature is usually 0 to 100° C., preferably 20° to 100° C.

The hydrogenation ratio can be freely adjusted by changing the hydrogen pressure, reaction temperature, reaction time, catalyst concentration, etc. However, the hydrogenated products used in the invention have a hydrogenation ratio of the double bonds present in the original non-hydrogenated polymer or copolymer of preferably at least 50%, more preferably at least 80% and especially at least 90%. Especially those hydrogenated products having a hydrogenation ratio exceeding 90% come to exhibit a solubility parameter (SP) range different from that of the resin before hydrogenation. Resin compositions excellent in solvent resistance can be obtained from such a resin.

Furthermore, in the preparation of the ring opening polymers, ring opening copolymers or hydrogenated products thereof as mentioned above in the invention, cycloolefins other than those represented by the formula [I] can be copolymerized. Such cycloolefins include cyclobutene,
cyclopentene,
cyclohexene,
3,4-dimethylcyclohexene,
3-methylcyclohexene,
2-(2-methylbutyl)-1-cyclohexene,
2,3,3a,7a-tetrahydro-4,7-methano-1H-indene and
3a,5,6,7a-tetrahydro-4,7-methano-1H-indene. These other cycloolefins can be used singly or in combination, and are usually used in an amount of 0 to 20 mol%.

When the ring opening polymerization or copolymerization is conducted as described above, the cycloolefin such as represented, for example, by the formula [I] opens its ring, and at least part of the products are considered to have a structure represented by the following formula [II]

The hydrogenated product obtained by hydrogenating double bonds is considered to have a structure represented, for example, by the formula [III]

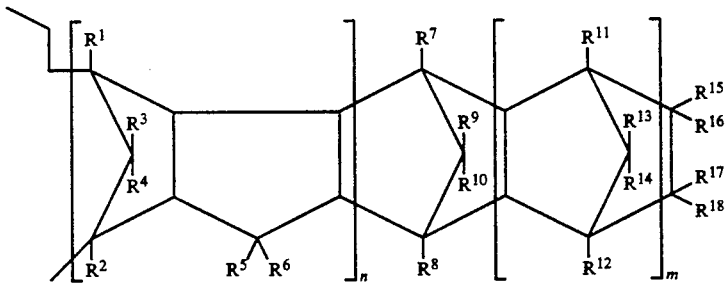

wherein m, n and $R^1$-$R^{18}$ are as defined in the aforementioned formula [I].

The ring opening polymers and copolymers, and hydrogenated products thereof can be used singly or in combination in the present invention. Moreover, it is preferable that these ring opening polymers, ring opening copolymers or hydrogenated products thereof are modified with unsaturated carboxylic acids such as maleic anhydride.

These cycloolefin ring opening polymers, ring opening copolymers or hydrogenated products thereof [B] have an intrinsic viscosity [$\eta$] of desirably 0.1 to 7 dl/g as measured in decalin at 135° C. and a melt flow rate of desirably 0.01 to 150 g/10 min as measured at 260° C. under a load of 2.16 kg.

CYCLOOLEFIN RANDOM COPOLYMER [C]

The cycloolefin random copolymer [C] contained in the resin compositions of the invention comprises, as essential structural units, structural units derived from ethylene and those derived from the aforementioned cycloolefin. The cycloolefin random copolymer [C] may also contain other copolymerizable unsaturated monomer structural units if desired, so long as these other structural units do not impair the object of the invention. Unsaturated monomers which may be copolymerized include concretely propylene, 1-butene, 4-methyl-1-pentene, 1-hexene, 1-octene, 1-decene, 1-dodecene, 1-tetradecene, 1-hexadecene, 1-octadecene and 1-eicosene. Of these, an α-olefin having 3 to 20 carbon atoms is preferable. Moreover, cycloolefins and cyclodienes such as norbornene, ethylidenenorbornene and dicyclopentadiene may also be used. These unsaturated monomer structural units may be contained in the

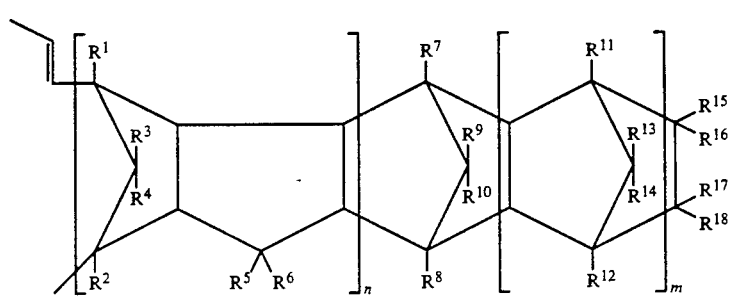

resulting random copolymer in a molar amount less than that of the structural units derived from ethylene.

The cycloolefin random copolymer [C] contained in the resin compositions according to the present invention comprises structural units derived from ethylene in an amount of 40 to 85 mol%, preferably 50 to 75 mol%. The copolymer [C] comprises structural units derived from the cycloolefin in an amount of 15 to 60 mol%, preferably 25 to 50 mol%. In the present invention, structural units derived from ethylene and those derived from the cycloolefin are randomly arranged to form a substantially linear cycloolefin random copolymer. The fact that the aforementioned cycloolefin random copolymer is substantially linear and has no gel-like crosslinking structure can be ascertained by observing complete dissolution of the copolymer in decalin at 135° C.

The cycloolefin random copolymer [C] contained in the resin compositions of the invention has an intrinsic viscosity [$\eta$], as measured in decalin at 135° C., of 0.05 to 10 dl/g, preferably 0.08 to 5 dl/g.

Furthermore, the cycloolefin random copolymer [C] contained in the resin compositions of the invention has a melt flow rate of 0.01 to 150 g/10 min as measured at 260° C. under a load of 2.16 kg.

Still furthermore, the cycloolefin random copolymer [C] contained in the cycloolefin resin compositions of the invention has a softening temperature (TMA), as measured by a thermomechanical analyzer, of at least 70° C., preferably 90° to 250° C. and especially 100° to 200° C.

The cycloolefin random copolymer [C] contained in the resin compositions of the invention has a glass transition temperature (Tg) of usually 50° to 230° C., preferably 70° to 210° C.

The cycloolefin random copolymer [C] contained in the resin compositions of the invention has a crystallinity, as measured by X-ray diffraction, of 0 to 10%, preferably 0 to 7% and especially 0 to 5%.

As the cycloolefin random copolymer [C] contained in the resin compositions according to the present invention, only the copolymers having physical properties in the above-mentioned range may be used. However, those having physical properties outside the above-mentioned range may also be partly contained. In this case, when the physical properties of the cycloolefin random copolymer [C] as a whole lie in the above-mentioned range, the random copolymer [C] can be used.

Such a cycloolefin random copolymer [C] can be manufactured by copolymerizing ethylene, cycloolefin, and if necessary other $\alpha$-olefin in a hydrocarbon solvent in the presence of a catalyst formed from a hydrocarbon-soluble vanadium compound and a halogen-containing organoaluminum compound.

The hydrocarbon solvents used herein include aliphatic hydrocarbons, alicyclic hydrocarbons and aromatic hydrocarbons. Moreover, monomers which are in a liquid form at the reaction temperature may be used as reaction solvents. These solvents may be used singly or in combination.

Useful vanadium compounds used as catalysts in the reaction include those represented by the general formula $VO(OR)_aV_b$ or $V(OR)_cX_d$, wherein R is a hydrocarbon group, $0 \leq a \leq 3$, $0 \leq b \leq 3$, $2 \leq a+b \leq 3$, $0 \leq c \leq 4$, $0 \leq d \leq 4$, and $3 \leq c+d \leq 4$.

More concretely, these vanadium compounds include
$VOCl_3$,
$VO(OC_2H_5)Cl_2$,
$VO(OC_2H_5)_2Cl$,
$VO(O-iso-C_3H_7)Cl_2$,
$VO(O-n-C_4H_9)Cl_2$,
$VO(OC_2H_5)_3$,
$VOBr_2$,
$VCl_4$,
$VOCl_2$,
$VO(O-n-C_4H_9)_3$, and
$VCl_3 \cdot 2OC_8H_{17}OH$. These vanadium compounds may be used singly or in combination.

Adducts of the vanadium compounds represented by the above-mentioned formula and electron donors may also be used in place of such vanadium compounds as mentioned above.

Examples of the electron donors which form adducts with the vanadium compounds mentioned above include oxygen-containing electron donors such as alcohols, phenols, ketones, aldehydes, carboxylic acids, esters of organic acids or inorganic acids, ethers, acid amides, acid anhydrides and alkoxysilanes, and nitrogen-containing electron donors such as ammonia, amines, nitriles and isocyanates.

Useful organoaluminum compounds which can be used as catalysts with the vanadium compounds as mentioned above include those having in the molecule at least one Al-C bond.

Examples of the organoaluminum compounds usable in the invention include organoaluminum compounds represented by the formula

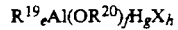

wherein $R^{19}$ and $R^{20}$, which may be the same or different, are each a hydrocarbon group of 1 to 15 carbon atoms, preferably 1 to 4 carbon atoms, X is halogen, $0 \leq e \leq 3$, $0 \leq f < 3$, $0 \leq g < 3$, $0 \leq h < 3$, and $e+f+g+h=3$, and complex alkylation compounds of metals belonging to Group I of the periodic table and aluminum, represented by the formula

wherein $M^1$ is Li, Na or K, $R^{21}$, which may be the same or different, are each a hydrocarbon group of 1 to 15 carbon atoms, preferably 1 to 4 carbon atoms.

In the aforementioned reaction system, the vanadium compounds are used in an amount of usually 0.01 to 5 g atom/l, preferably 0.05 to 3 g atom/l in terms of vanadium. Moreover, the organoaluminum compounds are used so that the ratio (Al/V) in the polymerization system of aluminum atoms to vanadium atoms is at least 2, preferably 2 to 50 and especially 3 to 20.

The cycloolefin random copolymer [C] contained in the resin compositions of the invention can be prepared, for example, by following the procedures proposed by the present applicant in Japanese Patent L-O-P Nos. 168708/1985, 120816/1986, 115912/1986, 115916/1986, 271308/1986, 272216/1986, 252406/1987 and 252407/1987, and suitably selecting the reaction conditions.

In the cycloolefin random copolymer [C] as described above, the structural unit derived from a cycloolefin represented by the above-mentioned formula [I] is considered to form a recurring unit of a structure represented by the formula [IV]

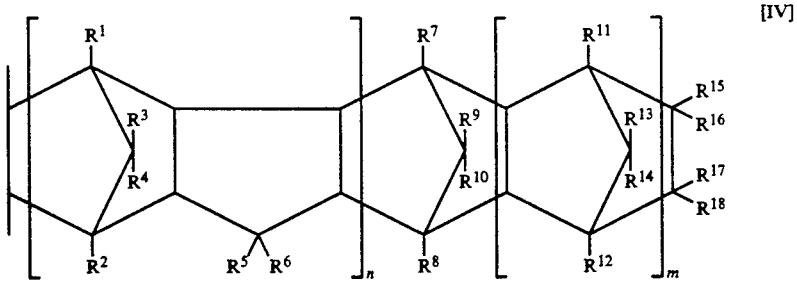

[IV]

wherein n, m and $R^1$–$R^{18}$ are as defined in the aforementioned formula [I].

Furthermore, in the present invention, it is preferable that the cycloolefin ring opening polymer or copolymer, or hydrogenated product thereof [B] as described above, or the cycloolefin random copolymer [C] ([B] and [C] being generally abbreviated to cycloolefin polymer) is modified with an unsaturated carboxylic acid such as maleic anhydride. Such a modified product can be manufactured by reacting the cycloolefin polymer as described above with an unsaturated carboxylic acid or an anhydride thereof, or a derivative of the unsaturated carboxylic acid such as an alkyl ester thereof. The modified cycloolefin polymer contains structural units derived from a modifier in an amount of usually not greater than 0.001 to 5% by weight. The modified cycloolefin polymer may be prepared by graft polymerizing a modifier to the cycloolefin polymer so that a desired modification ratio is obtained, or by preparing a modified product of the cycloolefin polymer having a high graft ratio at first, and then mixing the modified product with the unmodified cycloolefin polymer.

In the vinyl chloride resin compositions of the invention, the ratio by weight of the total amount of the cycloolefin ring opening polymer or copolymer, or hydrogenated product thereof [B] and the cycloolefin random copolymer [C] ([B] +[C]) to the weight of the vinyl chloride resin [A] {([B]+[C])/[A])} is 98/2 to 2/98, preferably 95/5 to 5/95.

OTHER ADDITIVES

In addition to the above-mentioned components [A], [B] and [C], the resin compositions of the invention may contain a rubber component for improving the impact strength thereof. It may also contain heat stabilizers, weathering stabilizers, antistatic agents, slip agents, anti-blocking agents, antihaze agents, lubricants, dyes, pigments, natural oil, synthetic oil, wax, etc. These additives are used in suitable amounts. Concrete examples of stabilizers to be used as optional components include phenolic antioxidants such as tetrakis[methylene-3-(3,5-di-tert-butyl-4-hydroxyphenyl)propionate]methane, alkyl β-(3,5-di-tert-butyl-4-hydroxyphenyl)propionate and 2,2'-oxamidobis[ethyl-3-(3,5-di-tert-butyl-4-hydroxyphenyl)]propionate, zinc stearate, calcium stearate, and aliphatic acid esters of polyhydric alcohols such as glycerin monostearate, glycerin monolaurate, glycerin distearate, pentaerythritol monostearate, pentaerythritol distearate and pentaerythritol tristearate.

Useful stabilizers include lead salts, metallic soaps and organotin compounds. Concrete examples of the lead salts include white lead, tribasic lead sulfate, dibasic lead phosphite, dibasic lead phthalate, lead silicate or coprecipitates of these compounds with silica gel.

The metallic soaps concretely include salts of organic acids such as stearic acid, 12-hydroxystearic acid, lauric acid, ricinoleic acid, naphthenic acid and 2-ethylhexanoic acid and metals such as lead, cadmium, barium, zinc and calcium.

Useful organotin compounds include concretely dibutyltin laurate, dibutyltin maleate and dibutyltin mercaptide.

These stabilizers may be used singly or in combination. One of the examples of the combination is a combination of tetrakis[methylene-3-(3,5-di-tert-butyl-4-hydroxyphenyl)propionate]methane, zinc stearate, glycerin monostearate and a lead salt.

In the present invention, the use of phenolic antioxidants and aliphatic acid esters of polyhydric alcohols in combination is particularly preferred. As the aliphatic acid ester of a polyhydric alcohol, an ester in which the alcoholic hydroxy group of the alcohol (at least trihydric) is partially esterified is preferred.

Concrete examples of the aliphatic acid ester of a polyhydric alcohol include aliphatic acid esters of glycerin such as glycerin monostearate, glycerin monolaurate, glycerin monomyristate, glycerin monopalmitate, glycerin distearate and glycerin dilaurate, and aliphatic acid esters of pentaerythritol such as pentaerythritol monostearate, pentaerythritol monolaurate, pentaerythritol dilaurate, pentaerythritol distearate and pentaerythritol tristearate.

Such phenolic antioxidants are used in an amount, based on 100 parts by weight of the vinyl chloride composition, of 0.01 to 10 parts by weight, preferably 0.05 to 3 parts by weight and especially 0.1 to 1 part by weight. The aliphatic acid esters of polyhydric alcohols are used in an amount, based on 100 parts by weight of the resin composition, of 0.01 to 10 parts by weight, preferably 0.05 to 3 parts by weight.

The vinyl chloride resin compositions of the invention may be incorporated with fillers, so long as the incorporation does not impair the object of the invention, such as silica, diatomaceous earth, alumina, titanium oxide, magnesium oxide, pumice powder, pumice balloons, aluminum hydroxide, magnesium hydroxide, basic magnesium carbonate, dolomite, calcium sulfate, potassium titanate, barium sulfate, calcium sulfite, talc, clay, mica, asbestos, glass fibers, glass flakes, glass beads, calcium silicate, montmorillonite, bentonite, graphite, aluminum powder, molybdenum sulfide, boron fibers, silicon carbide fibers, polyethylene fibers, polypropylene fibers, polyester fibers and polyamide fibers.

The vinyl chloride resin compositions of the invention may also be incorporated with olefin resin (including rubber) derived from a hydrocarbon having one or more of unsaturated bonds.

Such polymers concretely include homopolymers such as polyethylene, polypropylene, polyisobutylene, polymethylbutene-1, poly-4-methylpentene-1, polybutene-1, polyisoprene, polybutadiene and polystyrene;

copolymers such as ethylene/propylene copolymer, propylene/butene-1 copolymer, propylene/isobutylene copolymer, styrene/isobutylene copolymer, styrene/butadiene copolymer and ethylene/propylene/diene copolymer, e.g., ethylene/propylene/hexadiene copolymer, ethylene/propylene/cyclopentadiene copolymer and ethylene/propylene/ethylidenenorbornene copolymer, or blends, grafted polymers, crosslinking products and block copolymers of the above-mentioned polymers.

Known methods can be applied to the preparation of the vinyl chloride compositions of the invention. Examples of the method for the preparation thereof include a method wherein the vinyl chloride resin component [A], the cycloolefin ring opening polymer or copolymer, or hydrogenated product thereof [B], and the cycloolefin random copolymer [C], and if desired other components are mechanically blended by an extruder, kneader, etc., a method wherein the components mentioned above are simultaneously dissolved into a suitable good solvent, for example, a hydrocarbon solvent such as hexane, heptane, decane, cyclohexane, benzene, toluene or xylene or the components are each separately dissolved into separate solvents and the resultant solutions are mixed, and the solvent or solvents are removed, and a method wherein these two methods are combined.

The vinyl chloride resin compositions according to the present invention contain a cycloolefin polymer having a high heat distortion temperature, a high pencil hardness and a low mold shrinkage factor in addition to the vinyl chloride resin component [A]. Accordingly, the resulting vinyl chloride resin composition has a high heat distortion temperature while maintaining various characteristics of the vinyl chloride resin.

The vinyl chloride resin compositions according to the present invention have various characteristics as described above, and therefore can be extensively used in the field requiring heat-resistant properties in addition to the field where conventional vinyl chloride resin is used.

MOLDED ARTICLES

Molded articles formed from the vinyl chloride resin compositions according to the present invention have an excellent balance among heat resistance, heat aging characteristics, mechanical properties, dielectric properties, chemical resistance and solvent resistance. Concrete examples of the molded articles include (1) automobile parts:
instrument panels, console boxes, meter clusters, column covers, grille door mirrors, fenders, bonnets and radiator grilles;

(2) machine housings:
tools (e.g., electric tools), business machines (e.g., word processors, personal computers, copying machines, printers, FDD and CRT), precision instruments (e.g., cameras) and electrical appliances (e.g., electronic ovens, electric rice cookers, refrigerators, pots and cleaners); and (3) machine parts:
scirocco fans for air conditioners.

The vinyl chloride resin compositions according to the present invention can be molded into molded articles by extrusion molding, injection molding, blow molding, rotary molding, etc. using, for example, a single screw extruder, a vented extruder, a twin screw extruder, a conical twin screw extruder, a Ko-kneader, a platificator, a mixtruder, a twin conical screw extruder, a planetary screw extruder, a gear extruder and a screwless extruder.

EFFECT OF THE INVENTION

The vinyl chloride resin compositions according to the present invention comprise a vinyl chloride resin and a cycloolefin polymer as illustrated above. Accordingly, the present invention can provide vinyl chloride resin compositions from which molded articles required to have heat resistance as well as flame retarding properties and chemical resistance can be prepared without losing the characteristics of polyvinyl chloride.

EXAMPLES

The present invention is further illustrated below with reference to examples, but it should be construed that the present invention is in no way limited to these examples.

Methods for measuring various physical properties and evaluation methods of the resin compositions of the present invention are described below.

(1) Preparation of test pieces
Resin compositions are molded into test pieces under the following conditions using an injection molding machine (trade name of IS-35P, manufactured by Toshiba Kikai K.K.):
a cylinder temperature of 220° C.;
a mold temperature of 60° C.;
primary injection/secondary injection pressures of 1000/800 kg/cm$^2$;
an injection speed (primary) of 30 mm/sec;
a screw rotation speed of 150 rpm; and
a cycle [(injection+dwell)/cooling] of 7/15 sec.
The test pieces are then allowed to stand at room temperature for 48 hours, and used for measurements.

(2) Melt flow rate (MFR$_T$)
The met flow rate is measured according to ASTM D 1238 at a predetermined temperature of T° C. under a load of 2.16 kg.

(3) Tensile test
The tensile test was conducted according to ASTM D 638 under the following conditions:
the shape of the test pieces: ASTM Type IV, with a thickness of 2 mm;
a test speed of 50 mm/min; and
a test temperature of 23° C.

(4) Heat deflection temperature (HDT)
The heat deflection temperature is measured according to ASTM D 648 under the following conditions:
the shape of the test piece: $5 \times 1/4 \times 1/2^t$ inch; and a load of 264 psi.

(5) Softening temperature (TMA)
The softening temperature is measured by observing the thermal deformation behavior of a sheet of 1 mm thick using a Thermo Mechanical Analyzer (trade name, manufactured by DuPont). That is, a quartz needle is placed on the sheet, and the sheet was heated at a rate of 5° C./min while a load of 49

EXAMPLE 1

A powder mixture (3 kg) of 100 parts by weight of a polyvinyl chloride (polymerization degree of 720, $MFR_{190}$ of 360 g/10 min, glass transition temperature Tg of 68° C.), and 3 parts by weight of tribasic lead sulfate and 1 part by weight of lead stearate as stabilizers was mixed with 1 kg of pellets prepared from a mixture of 100 parts by weight of a random copolymer as a cycloolefin polymer component of ethylene and 1,4,5,8-dimethano-1,2,3,4,4a,5,8,8a-octahydronaphthalene

abbreviated to DMON hereinafter) as a cycloolefin polymer component (ethylene content of 62 mol% as measured by $^{13}$C-NMR, $MFR_{260}$ of 35 g/min, intrinsic viscosity [η] of 0.47 dl/g as measured in deoalin at 135° C., softening temperature (TMA) of 148° C., glass transition temperature Tg of 137° C.) and 0.5 part by weight of tetrakis[methylene-3-(3,5-di-tert-butyl-4-hydroxyphenyl)propionate]methane as a stabilizer. The mixture was melt blended by a twin-screw extruder (trade name of PCM 45, manufactured by Ikegai Tekko K.K.) at a cylinder temperature of 170° C., and pelletized by a pelletizer. Test pieces were prepared from the pellets thus obtained by the method mentioned above, and the physical properties thereof were measured.

The results are shown in Table 1.

EXAMPLE 2

Example 1 was repeated except that the same polyvinyl chloride-containing powder and the same cycloolefin copolymer-containing pellets as in Example 1 were used in the proportion by weight of 1/1 to melt blend and obtain test pieces. The physical properties of the test pieces were measured.

The results are shown in Table 1.

EXAMPLE 3

Example 1 was repeated except that the same polyvinyl chloride-containing powder and the same cycloolefin copolymer-containing pellets as in Example 1 were used in the proportion by weight of ⅓, and that 15 parts by weight of antimony trioxide and 1 part by weight of polytetrafluoroethylene powder were added as flame retarding assistants to 100 parts by weight of the mixture of pellets to melt blend and obtain test pieces. The physical properties of the test pieces were measured.

The results are shown in Table 1.

COMPARATIVE EXAMPLE 1

Test pieces were prepared by using only the same polyvinyl chloride as in Example 1, and the physical properties thereof were measured.

The results are shown in Table 1.

EXAMPLE 4

Example 1 was repeated except that a vinyl chloride/vinyl acetate copolymer containing 5 mol% of vinyl acetate (polymerization degree of 750, $MFR_{190}$ of 370 g/10 min, glass transition temperature Tg of 58° C.) was used in place of the polyvinyl chloride in Example 1, and 3 kg of the powder containing this copolymer and 1 kg of the same cycloolefin copolymer-containing pellets were mixed to obtain test pieces. The physical properties of the test pieces were measured.

The results are shown in. Table 1.

COMPARATIVE EXAMPLE 2

Test pieces were prepared by using only the same vinyl chloride/vinyl acetate copolymer as in Example 4, and the physical properties were measured.

The results are shown in Table 1.

EXAMPLE 5

Example 1 was repeated except that an ethylene/D-MON copolymer (ethylene content of 71 mol% as measured by $^{13}$C-NMR, $MFR_{260}$ of 20 g/10 min, intrinsic viscosity [η] of 0.6 dl/g, softening temperature (TMA) of 115° C., glass transition temperature Tg of 98° C.) was used in place of the ethylene/DMON copolymer in Example 1, and 1 kg of the pellets containing this cycloolefin copolymer was mixed with 3 kg of the same polyvinyl chloride containing powder to obtain test pieces. The physical properties of the test pieces were measured.

The results are shown in Table 1.

TABLE 1

| Example | Polyvinyl chloride/ copolymer (wt. ratio) | Tensile strength at break (kg/cm²) | HDT (°C.) | Flame retardance |
|---|---|---|---|---|
| Example 1 | 75/25 | 530 | 80 | V-O |
| Example 2 | 25/75 | 490 | 100 | V-O |
| Example 3 | 25/75 | 540 | 125 | V-O |
| Comp. Example 1 | 100/0 | 520 | 70 | V-O |
| Example 4 | 75/25 | 490 | 70 | V-O |
| Comp. Example 2 | 100/0 | 510 | 60 | V-O |
| Example 5 | 75/25 | 550 | 75 | V-O |

I claim:
1. A vinyl chloride resin composition comprising:
 (1) (A) a vinyl chloride resin having a polymerization degree of 200 to 5,000, a glass transition temperature (Tg) of 40° to 90° C. and a melt flow rate of 0.1 to 500 g/10 min as measured at 190° C. under a load of 2.16 kg; and
 (2) (B) a hydrogenated product of a cycloolefin ring opening polymer or copolymer formed by ring opening polymerization of a cycloolefin represented by the following formula (I), said hydrogenated product having an intrinsic viscosity (η), as measured in decalin at 135° C., of 0.1 to 7 dl/g and a melt flow rate of 0.01 to 150 g/10 min as measured at 260° C. under a load of 2.16 kg, and/or
 (C) a cycloolefin random copolymer of ethylene and a cycloolefin represented by the following formula

(I), said copolymer having an intrinsic viscosity (η), as measured in decalin at 135° C., of 0.05 to 10 dl/g and a glass transition temperature (Tg) of at least 70° C.;

wherein the formulation ratio by weight of the total amount of the hydrogenated product of the cycloolefin ring opening polymer or copolymer (B) and the cycloolefin random copolymer (C) to the amount of the vinyl chloride resin (A) ( ((B)+(C))/(A) ) is 75/25 to 5/95;

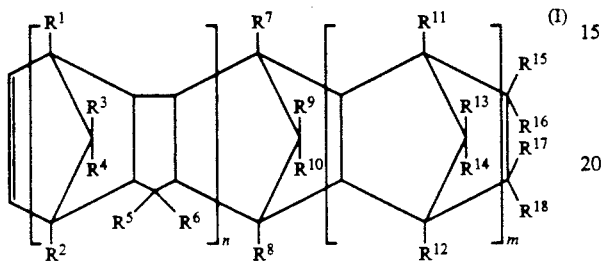

wherein n is 0 or 1, m is 0 or a positive integer, providing m+n≧1, $R^1$-$R^{18}$ are each independently a hydrogen, a halogen or a hydrocarbon group, with the proviso that $R^{15}$-$R^{18}$, linked together, may form a monocyclic ring or polycyclic ring which may have a double bond, and with the further proviso that $R^{15}$ and $R^{16}$ or $R^{17}$ and $R^{18}$ may together form an alkylidene group.

2. A vinyl chloride resin composition comprising:
(1) (A) a vinyl chloride resin having a polymerization degree of 200 to 5,000, a glass transition temperature (Tg) of 40° to 90° C. and a melt flow rate of 0.1 to 500 g/10 min as measured at 190° C. under a load of 2.16 kg; and
(2) (B) a hydrogenated product of a cycloolefin ring opening polymer or copolymer formed by ring opening polymerization of a cycloolefin represented by the following formula (I), said hydrogenated product having an intrinsic viscosity (η), as measured in decalin at 135° C., of 0.1 to 7 dl/g and a melt flow rate of 0.01 to 150 g/10 min as measured at 260° C. under a load of 2.16 kg, and/or
(C) a cycloolefin random copolymer of ethylene and a cycloolefin represented by the following formula (I), said copolymer having an intrinsic viscosity (η), as measured in decalin at 135° C., of 0.05 to 10 dl/g and a glass transition temperature (Tg) of at least 70° C.;
(3) at least one stabilizer selected from the group consisting of lead salts, metallic soaps and organotin compounds;

wherein the formulation ratio by weight of the total amount of the hydrogenated product of the cycloolefin ring opening polymer or copolymer (B) and the cycloolefin random copolymer (C) to the amount of the vinyl chloride resin (A) ( ((B)+(C))/(A) ) is 75/25 to 5/95;

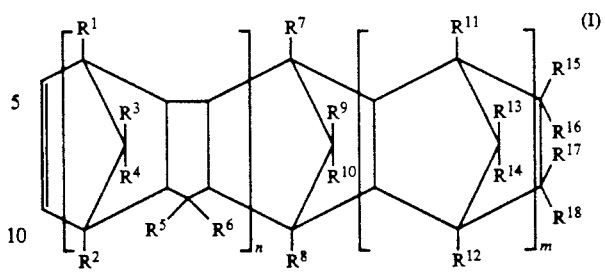

wherein n is 0 or 1, m is 0 or a positive integer, providing m+n≧1, $R^1$-$R^{18}$ are each independently a hydrogen, a halogen or a hydrocarbon group, with the proviso that $R^{15}$-$R^{18}$, linked together, may form a monocyclic ring or polycyclic ring which may have a double bond, and with the further proviso that $R^{15}$ and $R^{16}$ or $R^{17}$ and $R^{18}$ may together form an alkylidene group.

3. A vinyl chloride resin composition comprising:
(1) (A) a vinyl chloride resin having a polymerization degree of 200 to 5,000, a glass transition temperature (Tg) of 40° to 90° C. and a melt flow rate of 0.1 to 500 g/10 min as measured at 190° C. under a load of 2.16 kg; and
(2) (B) a hydrogenated product of a cycloolefin ring opening polymer or copolymer formed by ring opening polymerization of a cycloolefin represented by the following formula (I), said hydrogenated product having an intrinsic viscosity (η), as measured in decalin at 135° C., of 0.1 to 7 dl/g and a melt flow rate of 0.01 to 150 g/10 min as measured at 260° C. under a load of 2.16 kg, and or
(C) a cycloolefin random copolymer of ethylene and a cycloolefin represented by the following formula (I), said copolymer having an intrinsic viscosity (η), as measured in decalin at 135° C., of 0.05 to 10 dl/g and a glass transition temperature (Tg) of at least 70° C.;
(3) at least one stabilizer selected from the group consisting of lead salts, metallic soaps and organotin compounds; and
(4) at least one stabilizer selected from the group consisting of phenolic antioxidants and aliphatic acid esters of polyhydric alcohols;

wherein the formulation ratio by weight of the total amount of the hydrogenated product of the cycloolefin ring opening polymer or copolymer (B) and the cycloolefin random copolymer (C) to the amount of the vinyl chloride resin (A) ( ((B)+(C))/(A) ) is 75/25 to 5/95;

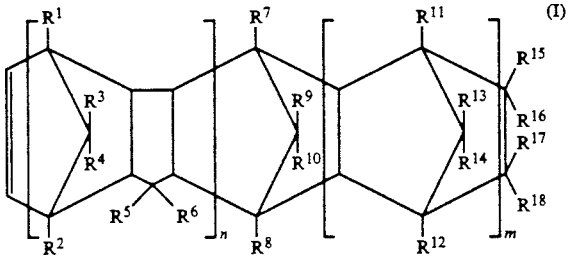

wherein n is 0 or 1, m is 0 or a positive integer, providing m+n≧1, $R^1$-$R^{18}$ are each independently a hydrogen, a halogen or a hydrocarbon group, with the proviso that $R^{15}$-$R^{18}$, linked together, may form a monocyclic ring or polycyclic ring which may have a double bond, and with the further proviso that $R^{15}$ and $R^{16}$ or $R^{17}$ and $R^{18}$ may together form an alkylidene group.

* * * * *